(12) United States Patent
Konrad et al.

(10) Patent No.: US 11,193,688 B2
(45) Date of Patent: Dec. 7, 2021

(54) FUSION-BASED OCCUPANCY SENSING FOR BUILDING SYSTEMS

(71) Applicant: Trustees of Boston University, Boston, MA (US)

(72) Inventors: Janusz L. Konrad, Framingham, MA (US); Prakash Ishwar, Brookline, MA (US); Thomas D C Little, Newton, MA (US); Michael Gevelber, Auburndale, MA (US)

(73) Assignee: Trustees of Boston University, Boston, MA (US)

( * ) Notice: Subject to any disclaimer, the term of this patent is extended or adjusted under 35 U.S.C. 154(b) by 219 days.

(21) Appl. No.: 16/420,797

(22) Filed: May 23, 2019

(65) Prior Publication Data

US 2019/0360714 A1   Nov. 28, 2019

Related U.S. Application Data

(60) Provisional application No. 62/675,331, filed on May 23, 2018.

(51) Int. Cl.
*F24F 11/56* (2018.01)
*F24F 11/88* (2018.01)
(Continued)

(52) U.S. Cl.
CPC .............. *F24F 11/56* (2018.01); *F24F 11/47* (2018.01); *F24F 11/63* (2018.01); *F24F 11/74* (2018.01);
(Continued)

(58) Field of Classification Search
None
See application file for complete search history.

(56) References Cited

U.S. PATENT DOCUMENTS

2012/0057050 A1   3/2012   Ashdown
2016/0088438 A1   3/2016   O'Keeffe
(Continued)

OTHER PUBLICATIONS

Balaji, et al., "Sentinel: Occupancy Based HVAC Actuation using Existing WiFi Infrastructure within Commercial Buildings", ACM 2013.
(Continued)

*Primary Examiner* — Sean Shechtman
(74) *Attorney, Agent, or Firm* — BainwoodHuang (57) ABSTRACT

Sensing and control apparatus for a building HVAC system includes interior and boundary sensors, such as cameras and thermal sensors, generating sensor signals conveying occupancy-related features for an area. A controller uses the sensor signals to produce an occupancy estimate and to generate equipment-control signals to cause the HVAC system to supply conditioned air to the area based on the occupancy estimate. The controller includes fusion systems collectively generating the occupancy estimate by corresponding fusion calculations, the fusion systems producing a boundary occupancy-count change based on sensor signals from the boundary sensors, an interior occupancy count based on sensor signals from the interior sensors, and the overall occupancy estimate. Fusion may be of one or multiple types including cross-modality fusion across different sensor types, within-modality fusion across different instances of same-type sensors, and cross-algorithm fusion using different algorithms for the same sensor(s).

18 Claims, 5 Drawing Sheets

(51) Int. Cl.
| | |
|---|---|
| F24F 11/89 | (2018.01) |
| F24F 11/47 | (2018.01) |
| F24F 11/63 | (2018.01) |
| F24F 11/74 | (2018.01) |
| F24F 120/14 | (2018.01) |
| F24F 120/10 | (2018.01) |
| F24F 120/12 | (2018.01) |

(52) U.S. Cl.
CPC .............. *F24F 11/88* (2018.01); *F24F 11/89* (2018.01); *F24F 2120/10* (2018.01); *F24F 2120/12* (2018.01); *F24F 2120/14* (2018.01); *G05B 2219/2614* (2013.01)

(56) References Cited

U.S. PATENT DOCUMENTS

| | | | | |
|---|---|---|---|---|
| 2016/0202678 A1* | 7/2016 | Aggarwal | ................ | H04N 5/33 700/275 |
| 2017/0017214 A1* | 1/2017 | O'Keeffe | ................ | G05B 15/02 |
| 2017/0146261 A1 | 5/2017 | Rogers et al. | | |
| 2018/0375444 A1* | 12/2018 | Gamroth | ................ | H02N 2/188 |

OTHER PUBLICATIONS

Beltran et al., "ThermoSense: Occupancy Thermal Based Sensing for HVAC Control", ACM 2013.
Benezeth, et al., "Towards a sensor for detecting human presence and characterizing activity", Elsevier B.V., Sep. 14, 2010.
Berger, et al., "Room Occupancy Measurement Using Low-Resolution Infrared Cameras", School of Computing, Edinburgh Napier University, UK, ISSC 2010, UCC, Cork, Jun. 23-24.
Chen, et al., "Semi-Coupled Two-Stream Fusion ConvNets for Action Recognition at Extremely Low Resolutions", IEEE Computer Society, 2017.
Chitu, et al., "Wireless System for Occupancy Modelling and Prediction in Smart Buildings", IEEE Computer Society, 2017.
Conti, et al., "Brain-inspired Classroom Occupancy Monitoring on a Low-Power Mobile Platform", IEEE Computer Society, 2014.
Cuevas, et al., "Detection of Stationary Foreground Objects Using Multiple Nonparametric Background-Foreground Models on a Finite State Machine", IEEE Transactions on Image Processing, vol. 26, No. 3, Mar. 2017.
Dalal, et al., "Histograms of Oriented Gradients for Human Detection", INRIA Rh^one-Alps, 655 avenue de l'Europe, Montbonnot 38334, France, 2005.
Dufaux, et al., "Efficient, Robust, and Fast Global Motion Estimation for Video Coding", IEEE Transactions on Image Processing, vol. 9, No. 3, Mar. 2000.
Erickson, et al., "POEM: Power-efficient Occupancy-based Energy Management System", ACM, 2013.
Gallagher, et al., "Airflow System Identification Tool for Optimizing Commercial Building VAV Settings for Improved Energy Efficiency", ASHRAE, 2015.
Garaza, et al., "Development of a Doorway Occupancy Counter based on Thermal Array Sensing Technology", IEEE, 2016.
Goyette, et al., "A Novel Video Dataset for Change Detection Benchmarking", IEEE Transactions on Image Processing, vol. 23, No. 11, Nov. 2014.
Gunnsteinsson, et al., "Airflow Based Model to Estimate Commericial Building HVAC Energy Use: Analysis to determine principal factors for different climate zones", 4th International High Performance Buildings Conference at Purdue, Jul. 11-14, 2016.
Ince, et al., "Occlusion-Aware Optical Flow Estimation", IEEE Transactions on Image Processing, vol. 17, No. 8, Aug. 2008.
Jodoin, et al., "Statistical Background Subtraction Using Spatial Cues", IEEE Transactions on Circuits and Systems For Video Technology, vol. 17, No. 12, Dec. 2007.
Jodoin, et al., "Motion Detection With an Unstable Camera", IEEE, ICIP 2008.
Jodoin, et al., "Behavior Subtraction", IEEE Transactions on Image Processing, vol. 21., No. 9, Sep. 2012.
Jodoin, et al., "Background Subtraction Framework Based on Local Spatial Distributions", ICIAR 2006, LNCS 4141, pp. 370-380, 2006.
Jodoin, et al., "Light and Fast Statistical Motion Detection Method Based on Ergodic Model", IEEE, ICIP 2006.
Junior, et al., "Crowd Analysis Using Computer Vision Techniques", IEEE Signal Processing Magazine, Sep. 2010.
Konrad, et al., "Bayesian Estimation of Motion Vector Fields", IEEE Transactions on Pattern Analysis and Machine Intelligence, vol. 14, No. 9, Sep. 1992.
Konrad, Janusz, "Motion Detection and Estimation" Elsevier Inc., 2008.
Leung, et al., "New MVAC control by making use of Human Behavioral Based Technique to achieve Energy Efficiency", 9th IET International Conference on Advances in Power System Control, Operation and Management (APSCOM 2012), Hong Kong, 2012, pp. 1-5.
Liu, et al., "Vision-based Indoor Occupants Detection System for Intelligent Buildings", IEEE, 2012.
Liu, et al., "Measuring indoor occupancy in intelligent buildings using the fusion of vision sensors", IOP Publishing Ltd., 2013.
Lu, et al., "Robust Occupancy Inference with Commodity WiFi", IEEE 12th International Conference on Wireless and Mobile Computing, Networking and Communications (WiMob), 2016.
McHugh, et al., "Motion Detection With False Discovery Rate Control", IEEE, ICIP, 2008.
McHugh, et al., "Foreground-Adaptive Background Subtraction", IEEE Signal Processing Letters, vol. 16, No. 5, May 2009.
Mehmood, et al., "Ghost Pruning for People Localization in Overlapping Multicamera Systems", 2014 International Conference on Computer Vision Theory and Applications (VISAPP), Lisbon, Portugal, 2014, pp. 632-639.
Motamedi, et al., "Fast and Energy-Efficient CNN Inference on IoT Devices", arXiv:1611.07151v1 [cs.DC], Nov. 22, 2016.
Paci, et al., "0, 1, 2, Many—A Classroom Occupancy Monitoring System For Smart Public Buildings", Proceedings of the 2014 Conference on Design and Architectures for Signal and Image Processing, Madrid, 2014, pp. 1-6.
Ristivojevic, et al., "Space-Time Image Sequence Analysis: Object Tunnels and Occlusion Volumes", IEEE Transactions on Image Processing, vol. 15, No. 2, Feb. 2006.
Roeper, et al., "Privacy-Preserving, Indoor Occupant Localization Using a Network of Single-Pixel Sensors", IEEE AVSS, Aug. 2016.
Ryan, et al., "Scene Invariant Crowd Counting", IEEE Computer Society, 2011.
Sajid, et al., "Universal Multimode Background Subtraction", IEEE Transactions on Image Processing, vol. 26, No. 7, Jul. 2017.
Saligrama, et al., "Video Anomaly Identification", IEEE Signal Processing Magazine, Sep. 2010.
St-Charles, et al., "SuBSENSE: A Universal Change Detection Method With Local Adaptive Sensitivity", IEEE Transactions on Image Processing, vol. 24, No. 1, Jan. 2015.
Stiller, et al., "Estimating Motion in Image Sequences", IEEE Signal Processing Magazine, Jul. 1999.
Tyndall, et al., "Occupancy Estimation Using a Low-Pixel Count Thermal Imager", IEEE Sensors Journal, vol. 16, No. 10, May 15, 2016.
Viola, et al., "Robust Real-Time Face Detection", International Journal of Computer Vision 57(2), 137-154, 2004.
Woodstock, et al., "Sensor Fusion for Occupancy Detection and Activity Recognition using Time-of-Flight Sensors", ISIF, 19th International Conference on Information Fusion, Heidelberg, Germany, Jul. 5-8, 2016.

* cited by examiner

FUSION-BASED OCCUPANCY SENSING FOR BUILDING SYSTEMS

STATEMENT OF GOVERNMENT SUPPORT

This invention was made with Government Support under Contract No. DE-AR0000944 awarded by the Department of Energy. The Government has certain rights in the invention.

BACKGROUND

The present disclosure is related to the field of systems whose operation or performance depends on the level or pattern of occupancy, such as heating, ventilation, and air conditioning (HVAC) systems of buildings for example. More particularly, the disclosure relates to techniques for tailoring operation of such systems to estimated occupancy levels or patterns, to provide energy savings, comfort, safety, or other system performance benefits.

SUMMARY

Described herein is an occupancy sensing system and uses thereof, including as part of a heating, ventilation, and air conditioning (HVAC) system of a building. The occupancy sensing system generates an estimate of the number of occupants in an area of a building, and uses the estimate for system purposes such as adjusting a rate of ventilation air flow to be tailored for the estimated occupancy. In some applications the building may be a commercial venue and include for example offices, conference rooms, large classrooms or conference rooms, and very large colloquium rooms. The system may be used with a variety of other building times. The system is inherently scalable to support a wide range of room sizes, from small offices to large meeting halls. This is a byproduct of a modular architecture enabling the addition of new units and seamlessly fusing their occupancy estimates with existing ones, thereby expanding coverage. The system can deliver robust performance by fusing information from multiple sensor modalities (e.g., wide-area, overhead sensing using panoramic cameras and local, entryway sensing using low-resolution thermal sensors) and from different algorithms (e.g., body counting versus crowd-density estimation). The system can be privacy-adaptive, using entryway sensors that collect only low-resolution, thermal data, facilitating deployment in bathrooms, changing rooms, etc. It may also be cost-effective by minimizing the number of sensors needed and, therefore, the cost of installation.

The system can exhibit a variety of innovations including: 1) multi-modal, multi-sensor, scalable design that can support various venue sizes, 2) novel occupancy estimation algorithms for high-resolution panoramic cameras and low-resolution thermal sensors based on state-of-the-art change detection methods, 3) advanced fusion algorithms, with adaptive sensitivity to overestimation, that account for illumination, occupancy level, etc. Regarding overestimation, some applications may place a hard limit on occupancy underestimation for health and safety reasons, while leaving room for overestimation as long as at least some minimum energy savings (e.g., 30%) are achieved. In many applications, a desired accuracy of operation can readily be achieved within such limits. These innovations can help to deliver desired occupancy-sensitive performance of an HVAC system.

More particularly, sensing and control apparatus are disclosed for use in an HVAC system of a building. The apparatus includes a plurality of sensors including interior sensors and boundary sensors, the sensors generating respective sensor signals conveying occupancy-related features for an area of the building. In one example the sensors include cameras in interior areas and low-resolution thermal sensors at ingress/egress points. The occupancy-related features may be specific aspects of camera images, or signal levels from the thermal sensors, that can be processed to arrive at an estimate of occupancy. The apparatus further includes a controller configured and operative in response to the sensor signals to produce an occupancy estimate for the area and to generate equipment-control signals to cause the HVAC system to supply conditioned air to the area based on the occupancy estimate. The controller generally includes one or more fusion systems collectively generating the occupancy estimate by corresponding fusion calculations, the fusion systems including a first fusion system producing a boundary occupancy-count change based on sensor signals from the boundary sensors, a second fusion system producing an interior occupancy count based on sensor signals from the interior sensors, and a third fusion system producing the occupancy estimate based on one or both of the boundary occupancy-count change and the interior occupancy count. Fusion may be of one or multiple types including cross-modality fusion across different sensor types, within-modality fusion across different instances of same-type sensors, and cross-algorithm fusion using different algorithms to generates respective estimates for the same sensor(s). Use of the occupancy sensing system can help to deliver desired occupancy-sensitive performance of the HVAC system, specifically the attainment of a desired energy savings without an undue incidence of undesirable under-ventilation.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Described herein is an occupancy sensing system and uses thereof. The majority of the description focuses on use as part of a heating, ventilation, and air conditioning (HVAC) system of a building. Other applications are also described including building space management, security, and others.

An Occupancy Sensing SYstem (OSSY) generates an estimate of the number of occupants in an area of a building, and uses the estimate for system purposes such as adjusting a rate of ventilation air flow to be tailored for the estimated occupancy. In some applications the building may be a commercial venue and include for example offices, conference rooms, large classrooms or conference rooms, and very large colloquium rooms. The system may be used with a variety of other building times. The system is inherently scalable to support a wide range of room sizes, from small offices to large meeting halls. This is a byproduct of a modular architecture enabling the addition of new units and seamlessly fusing their occupancy estimates with existing ones, thereby expanding coverage. The system can deliver robust performance by fusing information from multiple sensor modalities (e.g., wide-area, overhead sensing using panoramic cameras and local, entryway sensing using low-resolution thermal sensors) and from different algorithms (e.g., body counting versus crowd-density estimation). The system can be privacy-adaptive, using entryway sensors that collect only low-resolution, thermal data, facilitating deployment in bathrooms, changing rooms, etc. It may also be cost-effective by minimizing the number of sensors needed and, therefore, the cost of installation.

The system can exhibit a variety of innovations including: 1) multi-modal, multi-sensor, scalable design that can support various venue sizes, 2) novel occupancy estimation algorithms for high-resolution panoramic cameras and low-resolution thermal sensors based on state-of-the-art change detection methods, 3) advanced fusion algorithms, with adaptive sensitivity to overestimation, that account for illumination, occupancy level, etc. Regarding overestimation, some applications may place a hard limit on occupancy underestimation for health and safety reasons, while leaving room for overestimation as long as at least some minimum energy savings (e.g., 30%) are achieved. In many applications, a desired accuracy of operation can readily be achieved within such limits. These innovations can help to deliver desired occupancy-sensitive performance of an HVAC system.

More specifically, one approach may leverage two complementary modalities to estimate occupancy: one which directly measures the instantaneous occupancy and another which measures the change of occupancy (departures and arrivals). An insight underlying this choice is that the temporal evolution of room occupancy can have two distinct phases: 1) transient phase when room occupancy either increases or decreases significantly in a short time span as people arrive at the start of an event or leave at the end, and 2) (quasi) steady-state phase when the room occupancy remains relatively stable for the duration of an event with small fluctuations that can be easily detected and tracked. Accurate estimation of occupancy may be significantly harder during transients than in steady state. Generally, transients are not only short lived, but also cumulatively account for only a small fraction of typical room utilization. Furthermore, the actual occupancy level is itself only a fraction of room capacity on average. One can accurately detect the onset of transient and steady-state phases, even if it is hard to get a very accurate estimate of the exact occupancy during a transient. This can be done by monitoring arrivals and departures at ingress and egress points (boundary conditions) using, e.g., door sensors. Accurately estimating steady-state occupancy is an easier problem and can be accomplished using cameras. This can be further improved and made robust by fusing decisions and/or data from multiple cameras and/or door sensors. Additionally, as mentioned, there may be more forgiveness for overestimation, thus in one approach occupancy can be overestimated (much more during transients than in steady state) while still meeting a minimum energy reduction goal.

Description of Embodiments

Figure 1:
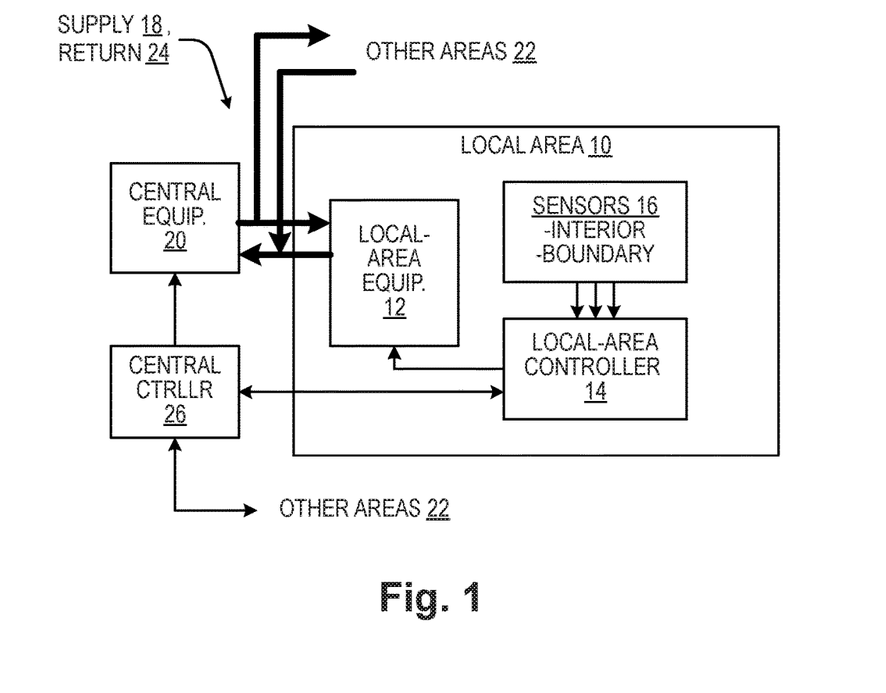
FIG. 1 is a block diagram of a heating, ventilation and air conditioning (HVAC) system incorporating occupancy sensing and occupancy-based control as described herein.

FIG. 1 is a general block diagram of an HVAC system employing occupancy sensing, i.e., explicitly estimating the number of people in a local area 10 and adjusting the operation of the HVAC system accordingly, to provide heating or cooling both sufficiently (i.e., meeting standards of temperature regulation and adequate ventilation, based on occupancy) and efficiently (i.e., using only an appropriate proportion of maximum ventilation capacity and avoiding wasteful over-ventilation). In practice, a local area 10 may be a single room or a collection of rooms, and the room(s) may be small or large. In some cases a local area 10 may correspond to part or all of a "zone" as that term is conventionally understood in HVAC systems, while in other cases it may span multiple zones in whole or in part.

As shown, the local area 10 includes local-area HVAC equipment 12, a local-area controller 14, and sensors 16 which include both "interior" sensors and "boundary" sensors, as described in more detail below. The local-area equipment 12, including for example local-area variable air volume (VAV) boxes, receive heated or chilled supply air 18 from central HVAC equipment 20 (e.g., chillers, heaters, large air movers) that provides the supply air 18 to either the entire building or a substantial portion of the building, indicated as other areas 22 which in general may resemble the local area 10. The local-area equipment 12 is responsible for regulating the flow volume through the local area 10, such as by adjusting the position of dampers, in response to control signals from the local-area controller 14. Also shown in FIG. 1 is a return 24 of air from the local area 10 back to the control equipment 20. Additionally, the local-area controller 14 may be in communication with a central controller 26 that is responsible for controlling operation of the central HVAC equipment 20, and that may have similar communications with the other areas 22.

In operation, the local-area controller 14 receives input information from the sensors 16 and uses this input information to generate an estimate of the actual occupancy of the local area 10. The occupancy estimate is used to generate control signals to the local-area equipment 12 to control the flow rate of supply air 18 through the local area 10. The local-area controller 14 may also provide occupancy information to the central controller 26, where the information from all the areas 10 and 22 may be used for separate control of the central equipment 20, e.g., to adjust fan speeds, operating temperatures, etc.

The remaining description elaborates primarily certain structural and functional details of components involved in occupancy estimation, i.e., the sensors 16 and local-area controller 14. In typical applications today, systems are limited to a binary occupied/unoccupied decision and operation. While such operation is an improvement over older systems by reducing idle ventilation, the system described herein can extend energy savings by delivering a more fine-grained air volume control over a range of room sizes, achieving greater efficiency without sacrificing ventilation quality.

Figure 2:
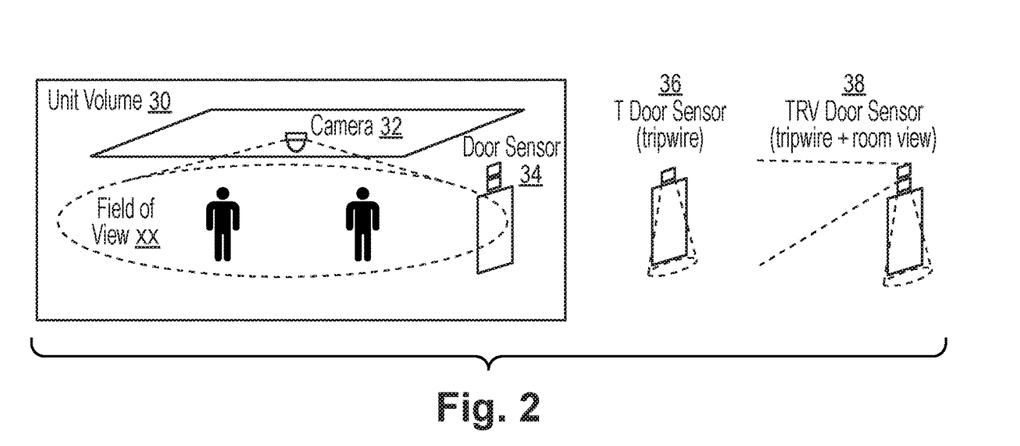
FIGS. 2-4 are schematic diagrams illustrating arrangements and uses of system components in a local area of a building.

FIG. 2 illustrates an aspect of the disclosed approach that can facilitate system scalability while supporting multiple occupancy-sensing modalities, for an area shown as a "unit volume" 30 such as a room. Two distinct types of sensor nodes may deployed in various combinations: interior sensors such as high-resolution (HR) panoramic overhead cameras 32 for wide-area monitoring, and boundary sensors such as low-resolution (LR) thermal sensors 34 located at doorways for ingress/egress detection. The use of panoramic cameras 32 can help minimize the number of sensors needed, thus reducing installation costs while still supporting scalability to large-size venues. The door sensors 34 may serve several roles. First, they provide transient phase data for fusion with steady-state occupancy data from the overhead cameras 32 or other interior sensors when used. For this purpose, in some cases a door sensor 34 may be as simple as a "tripwire", shown as a "T Door Sensor 36", that only detects ingress/egress. Such a tripwire sensor 36 may employ low-resolution (LR) thermal sensing for example. Secondly, in small-venue scenarios where panoramic cameras 32 are not used, the door sensors 34 may be realized as TRV door sensors 38 equipped with both an LR thermal "tripwire" (pointing down at the door opening) and an LR "room view" thermal array pointed into the room, for determining both transient and steady-state phase of occupancy. Additionally, if the door sensors 34 collect only LR thermal data, they are generally suitable for privacy-sensitive areas such as restrooms etc.

Figure 3:
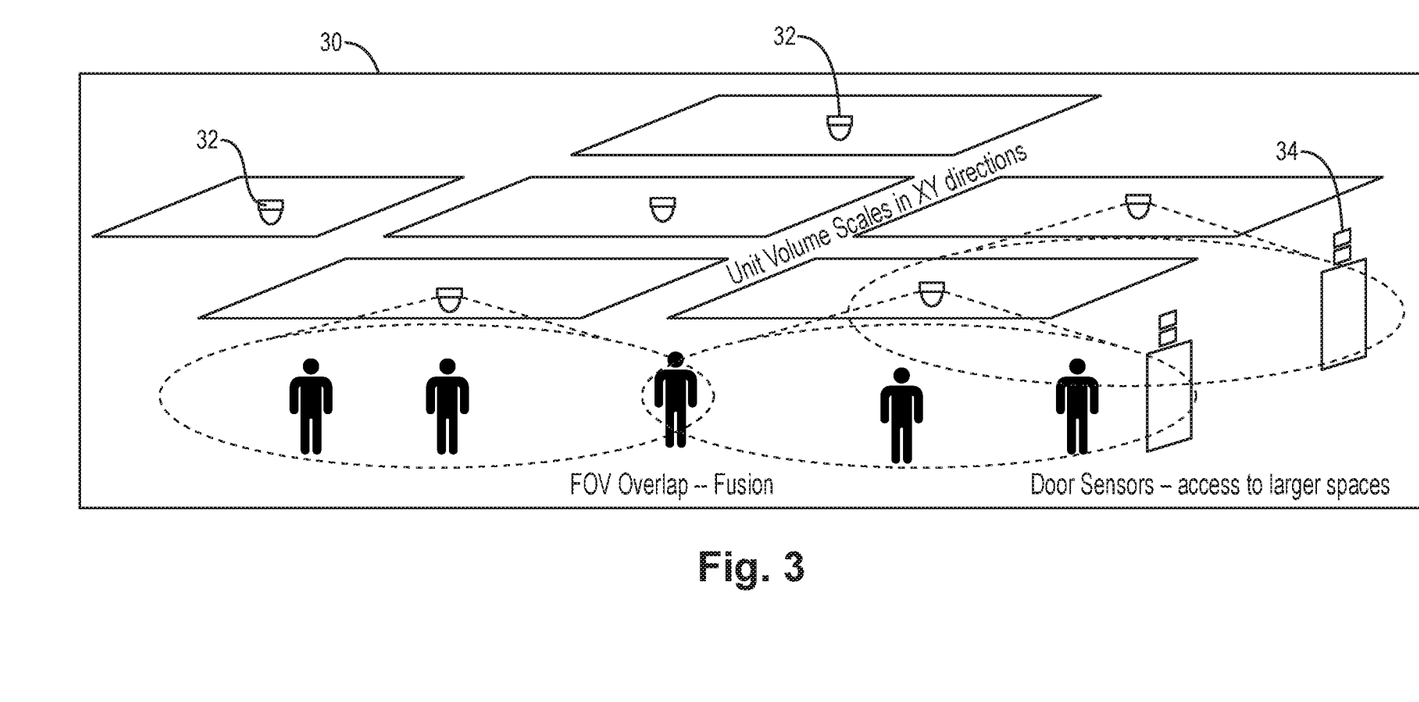

FIG. 3 illustrates how the architecture can offer scaling and flexibility in supporting various venue sizes and use scenarios, which might include the following: only cameras 32 in large halls with no clear entryways; both cameras 32 and T door sensors 36 in large venues with clear entryways; T and TRV door sensors (not separately shown) in mid-size conference rooms with more than one door; one T or TRV door sensor per bathroom; and one T door sensor per small office. Also shown in FIG. 3 is the possibility of field-of-view (FOV) overlap among cameras 32 and the use of fusion accordingly, as described more fully below.

Figure 4:
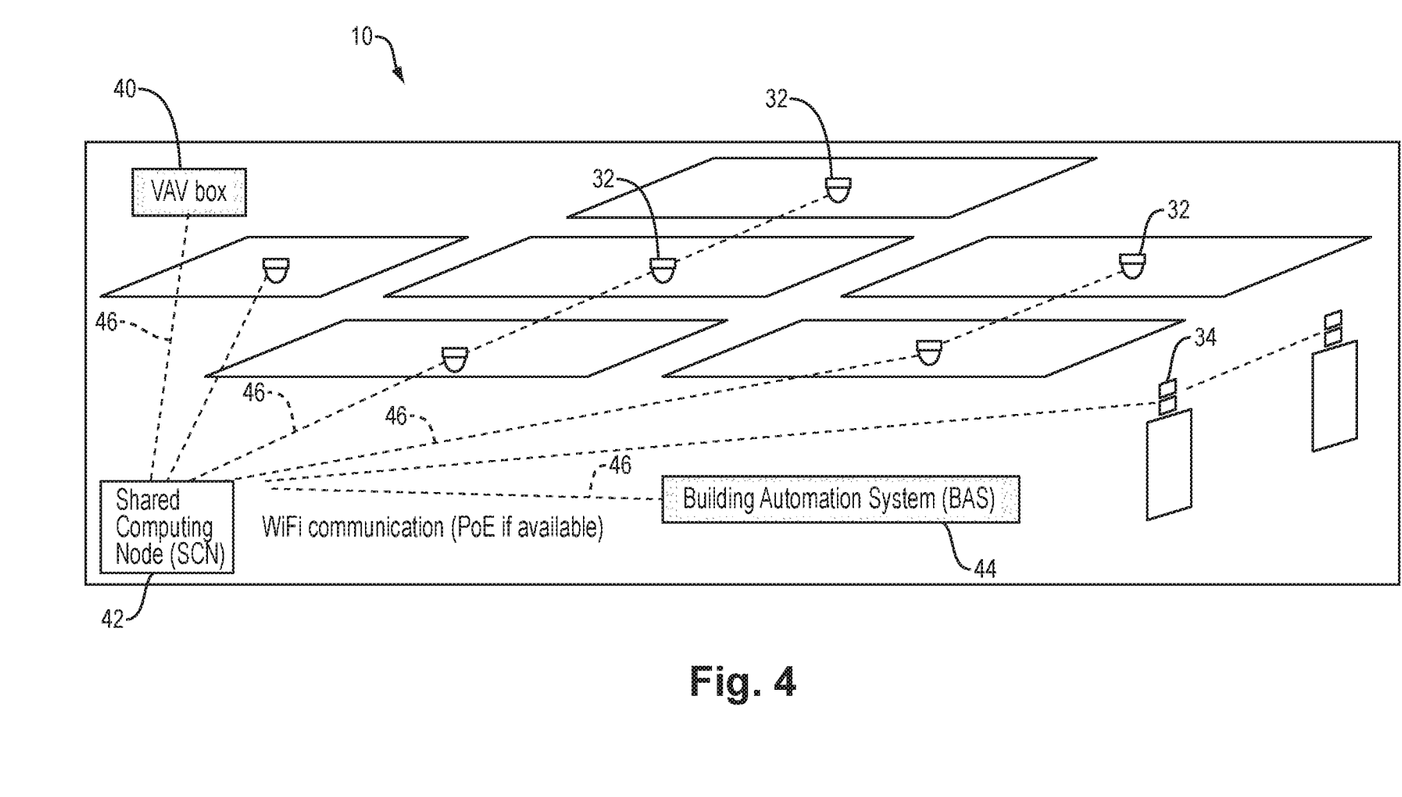

FIG. 4 shows a local area 10 with a more structural focus, including a variable air volume (VAV) box 40 as an example of local-area equipment 12 (FIG. 1), and a shared computing node (SCN) 42 as an example of a local-area controller 14. Also shown is a separate building automation system (BAS) 44 as an example of a central controller 26 (also FIG. 1), and communications connections 46 between the SCN 42 and the sensors 32, 34 as well as the BAS 44. The connections 46 may be realized in various ways including as wireless connections (e.g., WiFi) and/or wired connections such as a Ethernet, either powered (PoE) or unpowered. The system may be realized as a standalone system (i.e., not connected to an external network or "cloud"), with one or more SCNs 42 providing data processing and fusion for multiple venues in the same control zone.

Figure 5:
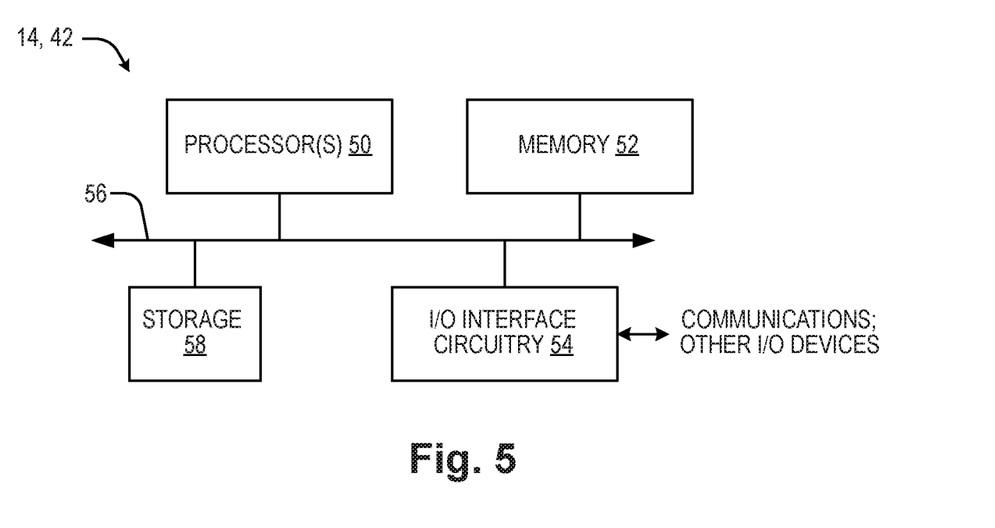
FIG. 5 is a block diagram of a local-area controller, also referred to as a shared computing node, from a hardware perspective.

FIG. 5 shows an example configuration of a physical computer from a computer hardware perspective, as may be used in realizing a local-area controller 14 or SCN 42 for example. The hardware includes one or more processors 50, memory 52, and interface circuitry 54 interconnected by data interconnections 56 such as one or more high-speed data buses. The interface circuitry 54 provides connections to the communications channels 46 (FIG. 4) for example and perhaps other external devices/connections (EXT DEVs). The processor(s) 50 with connected memory 52 may also be referred to as "processing circuitry" herein. There may also be local storage 58 such as a local-attached disk drive or Flash drive. In operation, the memory 52 stores data and instructions of system software (e.g., operating system) and one or more application programs which are executed by the processor(s) 50 to cause the hardware to function in a software-defined manner. In the disclosed OSSY system such software includes occupancy estimation software and local-area control software providing corresponding functionality as described more fully below. Application software may be stored on a non-transitory computer-readable medium such as an optical or magnetic disk, Flash memory or other non-volatile semiconductor memory, etc., from which it is retrieved for execution by the processing circuitry, as generally known in the art.

Figure 6:
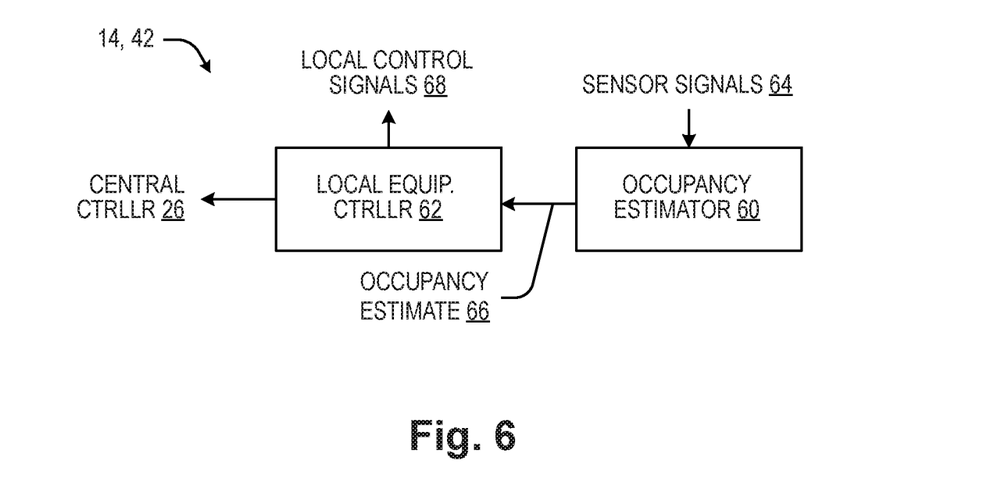
FIG. 6 is a block diagram of a local-area controller or shared computing node from a functional perspective as may be realized by execution of corresponding computer software.

FIG. 6 illustrates details of the local-area controller 14 or SCN 42 from a functional perspective, with the functions being realized by execution of computer program instructions as explained above. Functional components include an occupancy estimator 60 and a local equipment controller 62. The occupancy estimator 60 receives sensor signals 64 from the sensors 16 (FIG. 1) and generates an occupancy estimate 66 that is provided to the local equipment controller 62. The local equipment controller 62 generates local control signals 68 for controlling operation of the local-area equipment 12 to provide a desired amount of local-area airflow according to the occupancy estimate 66 as described herein. For example, the local equipment controller 62 may convert the occupancy estimate 66 into a corresponding fraction of maximum occupancy, and control airflow accordingly. Thus if the occupancy is at 50% of maximum, for example, the local-area airflow is adjusted to 50% of maximum airflow. As previously indicated, the local equipment controller 62 may also communicate with the central controller 26 in support of broader system-level control.

Figure 7:
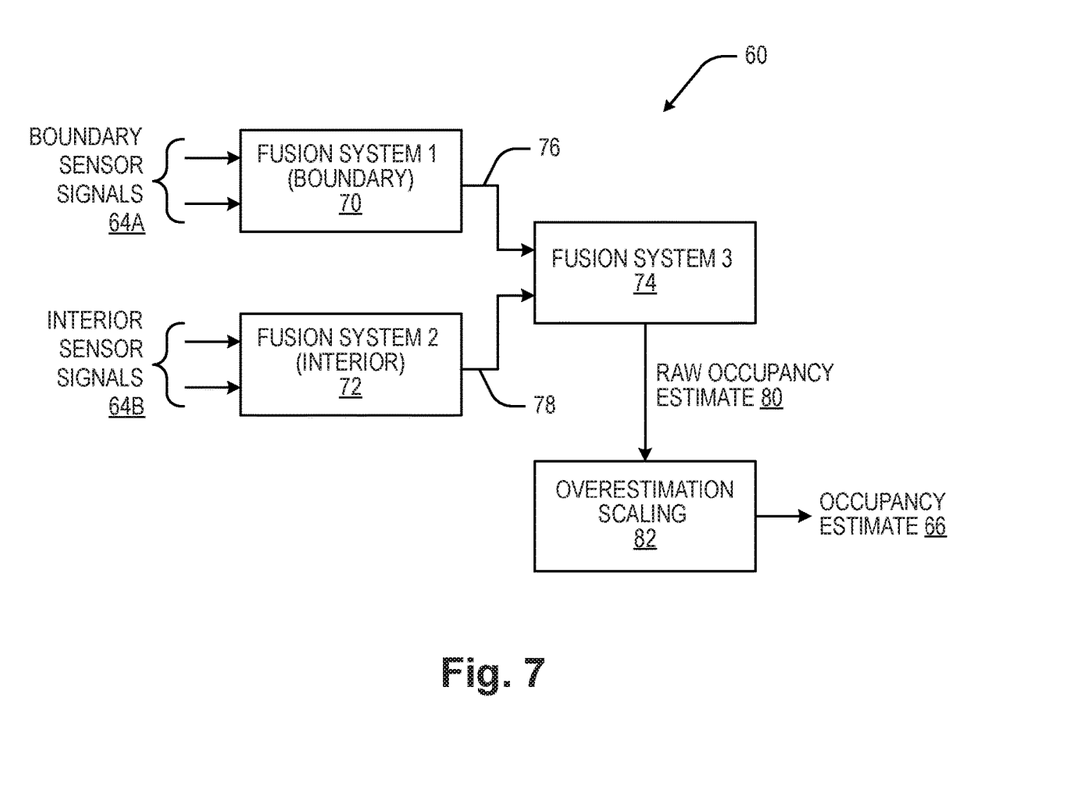
FIG. 7 is a block diagram of an occupancy estimator component of the local-area controller.

FIG. 7 illustrates certain detail of the occupancy estimator 60 in one embodiment. The occupancy estimate 66 is generated by processing of the sensor signals 64 grouped as shown into boundary sensor signals 64A and interior sensing signals 64B. The boundary sensor signals 64A are generated by boundary sensors (of sensors 16) generally located at ingress/egress points and perhaps specialized for detecting individuals, such as the door sensors 34. The interior sensor signals 64B are generated by interior sensors (of sensors 16) such as cameras 32 that cover interior areas that are occupied during steady state. The occupancy estimator 60 employs a certain type of data fusion using collections of one or more fusion systems, shown as fusion system 1 (ref 70), fusion system 2 (ref 72), and fusion system 3 (ref 74). Fusion systems 1 and 2 generate respective boundary and interior estimates 76, 78, and fusion system 3 performs additional calculations on the estimates 76, 78 to generate a raw occupancy estimate 80. This is supplied to an overestimation scaling unit 82 which applies a scaling factor to generate the occupancy estimate 66 provided to the local equipment controller 62 (FIG. 6).

The arrangement in FIG. 7 that includes all three fusion systems 70, 72 and 74 is one general type of embodiment. Alternative embodiments may employ different subsets and combinations of these fusion systems. For example, a system may employ only fusion system 1 70 an fusion system 3 74 for example, in which case fusion system 3 performs fusion calculations only across different estimates provided from fusion system 1 70. In arrangements that lack fusion system 3 74, the raw occupancy estimate 80 may be generated directly out of fusion system 1 70 or fusion system 2 72 as the case may be.

Details regarding fusion calculations are described further below, after additional system-level description which follows immediately. Also provided below is a description of the operation of the overestimation scaling unit 82.

For a wide range of commercial venue sizes, it may be a challenge to find a single sensing modality to simultaneously satisfy performance and cost constraints. In one embodiment, the proposed standalone, wireless occupancy sensing system can address this challenge by leveraging two complementary sensing modalities: high-resolution (HR) panoramic cameras 32 and low-resolution (LR) door sensors 34. Used jointly in challenging scenarios, such as illumination changes or fast-moving crowds, these modalities are expected to deliver reliable occupancy estimates by means of advanced fusion. This unique combination of technologies is capable of supporting occupancy sensing needs in a very wide range of buildings of different sizes and uses, from individual employee offices and small conference rooms, for just a few people, to huge lecture halls where hundreds of people may congregate. Due to the use of panoramic cameras 32, the disclosed system can minimize the number of sensors needed, thus limiting installation costs. By also using LR door thermal sensors 34, it can also support small-venue scenarios calling for privacy, and do so at a low cost. The proposed system uses standalone computing infrastructure and wireless (or PoE) communication, independent of the cloud and of networks existing in commercial venues.

Thus in brief summary, disclosed is a modular architecture employing occupancy sensing that scales with venue size by aggregating unit volumes 30. Various combinations of camera units 32 and door sensors 34 allow flexibility in supporting a myriad of venue configurations (as discussed above) while facilitating fusion across different sensor modalities, different instances of same-type sensors (e.g., across multiple cameras 32) and even different estimation algorithms for a given set of sensors (describe further below). Computational load balancing can be provided by use of local controllers 14 such as shared computing nodes (SCNs) 42 which support data processing and fusion for multiple unit volumes 30 within a control zone. The system may be standalone system (not connected to the cloud) and use wireless communication between sensors, SCNs and BAS, while also supporting Power-over-Ethernet (PoE) in compatible legacy environments.

Assuming that the system operates based on a given rate of occupancy estimation, such as once per minute for example, the SCNs 42 aggregate data and respond within such a time period. The sensing units preferably acquire data at a rate compatible with occupancy variations (cameras 32) or body speed (door sensors 34) to minimize the potential for aliasing. Since cameras 32 are responsible for steady-state occupancy data, a frame rate of about 1 Hz should be adequate. A 3.0 MPixel panoramic camera typically produces a bit rate of about 10 Mb/s for high-quality 30 Hz video using H.264/AVC compression, but this rate would drop to about 330 Kb/s at 1 Hz. Multiple cameras can be easily supported by WiFi or wired Ethernet (CAT5 in legacy and CAT6 in new buildings). Use of PoE, providing DC power, can additionally reduce installation costs, and is supported by CAT5 wiring. To assure accurate ingress/egress detection, door sensors 34 preferably sample at 10-20 Hz, but at 16×4 resolution this would result in no more than 40 Kb/s of uncompressed data rate. This rate is compatible with lower-rate communications connections such as Zig-Bee, although it may be preferred to use WiFi or wired Ethernet for commonality with the cameras 32.

Another factor is the configuration or "commissioning" of a system into operation. To support a variety of venue configurations, it is preferable that algorithms be agnostic to configuration variations, e.g., camera/sensor installation height, room size and shape. In the case of human-body counting, the camera installation height and room size affect a projected body size and, therefore, call for a scale-invariant human-body detector, which is a problem considered to have been solved. In the case of crowd density estimation from a panoramic camera, every pixel contributes in some proportion to a body count but this proportion is dependent on pixel location on the sensor (e.g., a pixel in the middle of a sensor, parallel to room's floor, will occupy a smaller fraction of human head, than a pixel at sensor's periphery, due to lens properties). However, the knowledge of intrinsic camera parameters, such as sensor size and resolution, focal length, lens diameter and barrel distortion, can be used to establish a relationship between pixel location and its contribution to crowd density (pixel-to-density mapping), very much like in methods to de-warp a fisheye image for visualization. Alternatively, a pixel-to-density mapping can be obtained experimentally in a room of maximum permissible size for various installation heights and camera models, and stored in a look-up table to use during deployment, thus making a crowd density estimation algorithm agnostic to camera installation height and room size. A similar mapping can be obtained for LR thermal sensors (both "tripwire" and room-view). Additionally, some thermal sensors such as Melexis sensors are available with different lenses (40°, 60°, 120° FOVs) allowing to match them to different combinations of room height and door width.

Thus in one example, at the time of commissioning a system the camera/sensor installation height needs to be provided. Alternatively, a precise calibration pattern can be placed directly under a camera/sensor and a self-calibration operation is performed. With the installation height known, a corresponding pixel-to-density map can be used algorithmically to provide accurate occupancy estimates. The system may employ data-driven or "machine-learning" methods which can provide robustness against real-world variability without a physical model, but it is preferred that such methods be kept simple and not require re-training in new environments. In some cases machine learning is used only for offline training of counting and fusion algorithms, and only a system is fine-tuned in real time through self-calibration to a new environment by setting certain global parameters, e.g., room height, spacing between units, etc.

Wide-Area Monitoring for Steady State

To estimate the (quasi) steady-state occupancy, in one example panoramic, overhead, high-resolution, low-cost CMOS cameras are used, which provide a wide field of view with minimal occlusions, while also being widely available and relatively inexpensive. OSSY preferably employs accurate, real-time (at HVAC time scale) algorithms for occupant counting using panoramic video frames. A fundamental block in many occupancy sensing algorithms is change detection (also referred to as background subtraction), which identifies areas of a video frame that have changed in relation to some background model, e.g., view of an empty room.

In one example, a system can employ multiple algorithms for people counting using data captured by a panoramic camera (640×480, 0.3 MPixels) mounted overhead in a room such as a computer lab. Variants of crowd density estimation are used which learn a mapping between the fraction of a video frame that has changed and the number of people in that frame—the more changes, the more people. Example algorithms include regression, Support Vector Machine (SVM) and k-Nearest Neighbor (kNN) search. Table 1 below shows a Correct Classification Rate (CCR) that can be obtained for people counting using these algorithms on data captured across several days with a specified number (e.g., 0 to 10) of occupants. Results from such a simple test case show that even simple change detection may provide 96% of accuracy with 0.01 mean absolute error (MAE) per occupant (kNN for k=5). Such an MAE value may be within maximum permissible limits needed to achieve desired performance targets.

TABLE 1

| | CCR/MAE | | | |
|---|---|---|---|---|
| Algorithm | Linear | Quadratic | Cubic | 4-th order |
| Regression | 54.0%/0.12 | 76.3%/0.09 | 78.0%/0.09 | 60.3%/0.10 |
| SVM | 87.4%/0.03 | 74.6%/0.06 | 69.4%/0.08 | 53.3%/0.17 |
| | k = 3 | k = 5 | k = 10 | k = 20 |
| kNN | 95.7%/0.01 | 96.0%/0.01 | 94.3%/0.01 | 92.3%/0.02 |

Change detection is the starting point for occupancy sensing. To be practical, it should be robust to illumination variations (e.g., time of day), camouflage effects (e.g., color of clothes similar to the background), long-term stationarity (motionless bodies), and furniture re-arrangement. Methods are known for addressing these issues, e.g., addressing illumination issues via multimode background models, or the use of a method known as SuBSENSE to deal with camouflage by spatially-variant model parametrization. The problem of long-term motionless bodies can be solved by using an ensemble of background models, corresponding to different time scales, while furniture re-arrangement can be addressed by computing an additional background model in periods of long inactivity, e.g., at night, which can be detected as a byproduct of occupancy sensing or knowledge of time.

Two known approaches to estimating occupancy level are (1) detecting and then counting human bodies, and (2) estimating number based on detected changes in a camera field of view (FOV). Recent occupancy sensing methods via human-body counting include: full-body detection using Haar features and ADABOOST, head counting using Harr or HOG (Histogram of Gradients) features and SVM classification, and head counting using Convolutional Neural Networks (CNNs). These methods show great robustness to variations in body size and orientation. Shallow CNNs may suffice (for body/non-body binary output) and could run on a low-power mobile platform. As for crowd-density estimation, algorithms are known that are based on image gradient changes followed by SVM, full-image CNNs, and a wealth of approaches at pixel, texture or object level.

In order to detect a transient phase (people entering/leaving), it is proposed to use low-resolution (LR), thermal sensors above doors for they do not capture a recognizable image of a person and produce low bit-rate data, thus requiring little processing power. In addition to detecting a body, the direction of movement needs to be estimated. Both are challenging tasks, especially at very low resolutions. Human body counting methods may be adapted to low resolutions. For direction estimation, selected algorithms may be adapted to LR thermal data. Algorithms can be refined by incorporating more advanced thermal background models, including for example multimodal backgrounds to deal with indoor temperature changes, and spatially-variant parametrization of the thermal background model to deal with camouflage effects (e.g., outer clothing in wintertime may weaken body's thermal signature). In terms of movement direction estimation, accuracy may be improved by applying noise reduction in thermal data (e.g., spatio-temporal filtering) or direction estimate aggregation (e.g., spatial and/or temporal majority vote).

Fusion Algorithms

Combining data and/or decisions from multiple complementary information sources can not only improve the accuracy of occupancy estimates, but also make them robust to environmental variability like rapid illumination changes, fast-moving crowds, low illumination, occupant's motionlessness and changes in room configuration. In general, three distinct types of fusion may be used in the disclosed system:
- Cross-modality fusion of estimates from sensors of different types, such as panoramic overhead cameras and thermal door tripwires.
- Within-modality fusion (or cross-instance fusion) of estimates from different sensors of the same type, such as overhead cameras having overlapping fields of view, or combinations of T and TRV sensors.
- Cross-algorithm fusion of different methods to estimate occupancy for a given set of one or more sensors, e.g., fusion between estimates provided by a crowd-density estimation algorithm and a human-body counting algorithm In scenarios where cross-modality or within-modality fusion may be highly desirable (large rooms) or just prove beneficial (rooms with one or more doors) fusion may be performed at shared computing nodes (SCNs) 42, which may be embedded systems that communicate wirelessly (or via PoE, if available) with a group of nearby cameras 32 and thermal sensors 34. SCNs 42 will be situated to simplify the installation and communication with HVAC management system (e.g., close to local-area equipment 12 such as a zone controller or a VAV unit). In scenarios where only thermal door tripwires are used (e.g., small rooms or rooms that need privacy), a microcontroller within the thermal sensor node may handle people counting and communicate the occupancy level to HVAC management directly.

In its full generality, a fusion algorithm can combine both raw data and decisions generated by different sensors through a complex, generally nonlinear relationship, e.g., kernel support vector regression and neural networks which can be trained using machine learning techniques. However, such an algorithm may be difficult to train (too many parameters relative to training data size) or may not generalize well to new deployment conditions without significant labor-intensive re-training that would impede self-commissioning and drive up cost. An alternative approach is to employ a recursive Bayesian filtering method like Kalman filtering (linear, extended, or unscented transform) or particle filtering with the system dynamics learned offline from training data. However, this can be computationally intensive for video data due to its high dimensionality. Hence while in general such options are not excluded, the present description assumes use of relatively simple-to-train adaptive algorithms that fuse occupancy estimates rather than raw data.

Returning to FIG. 7, the disclosed system provides for continuous estimation of the number of occupants within a local area or zone using one or more of the following:
1. Temporally recursive update, within a specifiable moving time window, of total boundary occupancy-count change produced by applying fusion system 1 (ref 70) to occupancy-count change detections produced by one or more algorithms applied to data from one or more devices each of one or multiple modalities monitoring ingress and/or egress regions of zone, and previous estimates of total boundary occupancy-count change;
2. Temporally recursive update, within a specifiable moving time window, of total interior occupancy count produced by applying fusion system 2 (ref 72) to occupancy count estimates produced by one or more algorithms applied to data from one or more devices each of one or multiple modalities monitoring interior regions of zone, and previous estimates of total interior occupancy count;
3. Temporally recursive update, within a specifiable moving time window, of number of occupants within zone produced by applying fusion system 3 (ref 74) to the outputs of fusion systems 1 and/or fusion system 2, and previous estimates of number of occupants within zone;
4. Fusion systems 1, 2 and 3 make use of parametric or non-parametric, linear or non-linear systems. Fusion systems 1, 2 and 3 take into account the rate at which the number of occupants in zone is changing, specifically whether it is changing rapidly (transient state) or sporadically (quasi steady state), and accordingly diminishing the influence of the boundary count or interior count, respectively, towards the estimation of the total number of occupants.
5. A system to continuously maximize energy savings for zone based on zone type or on current, recent, or historical estimates of number of occupants in zone while simultaneously not exceeding a maximum failure rate which can be specified. This is accomplished by scaling the estimate of the number of occupants in zone at each time instant by an overestimation factor greater than or equal to one based on zone type or current, recent, or historical estimates of number of occupants in zone.

For the above formulation in terms of fusion systems 1, 2 and 3, below is a general mathematical description:

1. Let l=1, ..., L denote the index of all sensors, all modalities, and all algorithms that are available at the boundary. Let $\hat{\Delta}_{bndry}[t]$ denote the estimated total boundary occupancy-count change produced by fusion system 1 at time t. Let $\hat{\Delta}_{bndry,l}[t]$, l=1, ..., L, denote the estimated occupancy-count changes produced boundary sensors/modalities/algorithms at time t. Let $\tau_1[t]$ denote the moving time window size at time t for fusion system 1. Then, $$\hat{\Delta}_{bndry}[t] = \text{fusion\_system\_1}(t, \{\hat{\Delta}_{bndry}[t-i], i=0, \ldots, \tau_1[t], l=1, \ldots, L\}, \{\hat{\Delta}_{bndry,l}[t-i], i=1, \ldots, \tau_1[t]\})$$

2. Let j=1, ..., K denote the index of all sensors, all modalities, and all algorithms that are available in the interior. Let $\hat{N}_{int}[t]$ denote the estimated total interior occupancy count produced by fusion system 2 at time t. Let $\hat{N}_{int,j}[t]$, j=1, ..., K, denote the estimated occupancy-counts produced by interior sensors/modalities/algorithms at time t. Let $\tau_2[t]$ denote the moving time window size at time t for fusion system 2. Then, $$\hat{N}_{int}[t] = \text{fusion\_system\_2}(t, \{\hat{N}_{int,j}[t-i], i=0, \ldots, \tau_2[t], j=1, \ldots, K\}, \{\hat{N}_{int}[t-i], i=1, \ldots, \tau_2[t]\})$$

3. Let $\hat{N}[t]$ denote the estimated number of occupants within zone produced by fusion system 3 at time t. Let $\tau_3[t]$ denote the moving time window size at time t for fusion system 3. Then, $$\hat{N}[t] = \text{fusion\_system\_3}(t, \hat{\Delta}_{bndry}[t], \hat{N}_{int}[t], \{\hat{\Delta}_{bndry}[t-i], \hat{N}_{int}[t-i], \hat{N}[t-i], i=1, \ldots, \tau_3[t]\})$$

Below is a more detailed mathematical description as an illustration of the above more general description. The description below is detailed for cross-modality estimate fusion in particular; the approach can be applied to the other two types of fusion as well.

Let the occupancy estimate at time t produced by combining information from all the HR overhead panoramic cameras 32 be denoted by $\hat{N}_c[t]$. Let $\hat{\Delta}[t]$ denote the estimate of the change in occupancy at time t generated by combining information from all the LR thermal door sensors (ingress/egress speed). Each estimate will be the outcome of its own within-modality fusion algorithm. Then, a simple fused occupancy estimate at time t is given by $$\hat{N}[t] = \hat{N}[t-\tau[t]] + \lambda[t](\hat{N}_c[t] - \hat{N}_c[t-\tau[t]]) + (1-\lambda[t]) \sum_{i=t-\tau[t]+1}^{t} \hat{\Delta}_d[i]$$

The first term on the right-hand side is the fused occupancy estimate $\tau[t]$ time steps before the current time (e.g., between 1 and 3 minutes). The second term is the change in occupancy (finite difference) as reckoned by all overhead cameras (weighted by factor $\lambda[t]$ between 0 and 1). The last term is the change in occupancy (finite sum) as estimated by all the door sensors (weighted by $(1-\lambda[t])$). The two algorithm parameters $\tau[t]$, $\lambda[t]$ may be determined by a simple table lookup based on current environmental conditions such as:

1. the most recent quantized occupancy level expressed as a fraction of room capacity: $\gamma[t-1]=\hat{N}[t-1]/\text{capacity}$ (e.g., 10%, 15%, 20%, 25%),
2. the most recent quantized rate of occupancy change $|\hat{N}[t-1]-\hat{N}[t-2]|$, (e.g., low, medium, or high flux),
3. the most recent change in the ambient illumination (e.g., dim, moderate, bright),
4. the time of day (e.g., morning, afternoon, night),
5. the work schedule (weekday/weekend, semester/summer, etc.)

A lookup table may be designed offline using ground-truth training data and regression techniques. The end result will be a coarsely-quantized map (table lookup) from environmental conditions to values for $\tau[t]$, $\lambda[t]$. The lookup table encodes changes to $\tau[t]$, $\lambda[t]$ relative to environmental conditions. If the rate of occupancy change is high (fast-moving crowds), then a transient phase is in operation and $\lambda[t]$ should be decreased to give more weight to the door sensor estimates and $\tau[t]$ should be decreased to deemphasize older measurements. If the rate of occupancy change is low, then a quasi-steady state is in effect and $\tau[t]$ can be increased. Further, if the illumination is good, then $\lambda[t]$ should be increased to give more weight to the overhead camera estimates. Similarly, if the ambient lighting changes rapidly (e.g., for a slide show) then the camera estimates should be de-weighted by decreasing $\lambda[t]$.

For within-modality fusion (or cross-instance fusion) of overhead cameras 32, a similar approach can be followed. Fusion is applied to regions where the fields of view (FOV) of two or more cameras overlap. The fused estimates from overlapping FOVs will be aggregated with estimates of no overlap to generate a single estimate $\hat{N}_c[t]$. In this context, a technique known as "ghost pruning" may be employed. Within-modality fusion of thermal "tripwires" and thermal sensors with a room view is similar to cross-modality fusion of thermal "tripwires" and overhead cameras (room-view sensors will play the role of overhead cameras in some scenarios).

For cross-algorithm fusion, a similar approach can be used to combine occupancy estimates from different algorithms applied to the same unit (overhead camera or thermal sensor), e.g., estimates based on crowd-density estimation via change detection and people counting via body shape detection.

In some cases, final fused estimates $\hat{N}[t]$ can be approximately modeled as Gaussian (being the weighted sum of estimates from several time instants, different modalities, and algorithms) with the true occupancy N[t] as the mean and standard deviation proportional to N[t] (less variability at low occupancy). Once a fused estimate is obtained, it may be intentionally scaled up to $\alpha\hat{N}[t]$ by an overestimation factor $\alpha>1$ which can be carefully designed to balance failure probability and average energy savings as explained more below.

Overestimation

Assuming that a system has a specified maximum failure rate, i.e., a rate of occurrence of under-ventilation conditions that might present a health or safety issue, one way to ensure compliance is to systematically use overestimation, i.e., to err on the side of increasing the occupancy estimate to account for uncertainty in the estimation process. The extreme case of such overestimation is to always apply maximum ventilation, i.e., to assume 100% occupancy, but clearly such an approach would provide no energy savings. Thus it is desired to employ a overestimation technique for which there is some confidence of achieving a target energy savings while also respecting the specified failure rate.

To this end, a probabilistic model may be used that relates an occupancy overestimation factor $\alpha>1$ to expected energy savings given average occupancy of a room $\gamma$ and the probability of a failure event (under-ventilation). Table 2 below provides an example illustration of how accurate an occupancy estimate must be, measured in terms of the maximum permissible Mean Absolute Error (MAE) per occupant, and to what degree the occupancy may be overestimated (factor $\alpha$) for different room types, while meeting the target energy savings and failure probability. Higher energy savings can be realized by decreasing $\alpha$ (less overestimation) and decreasing MAE (better estimation quality).

TABLE 2

| Room type | Average occupancy $\gamma$ | Energy savings % | Max. permissible overestimation factor $\alpha$ | Max. permissible MAE per occupant |
|---|---|---|---|---|
| Colloquium | 0.19 | 30% | 1.66 | 0.09 |
| Office | 0.21 | 30% | 1.50 | 0.08 |
| Conference | 0.22 | 30% | 1.43 | 0.07 |
| Classroom | 0.23 | 30% | 1.37 | 0.06 |

With N denoting the current occupancy, the average occupancy expressed as a fraction of room capacity is $\gamma=E[N]/$capacity which ranges from 0.18 for research labs to 0.23 for classrooms in one example. The occupancy estimate 66 produced by the estimator 60 may be modeled as a random variable $\hat{N}$ that, given N, is normally distributed with mean N and standard deviation $\mu N$, corresponding to a per-occupant Mean Absolute Error (MAE) of $\mu\sqrt{2/\pi}$. The occupancy level that is actually reported to the HVAC system can, however, be intentionally overestimated by a factor $\alpha>1$ that can be carefully designed to meet the failure rate constraints while maximizing energy savings.

In one example a failure event probability is given by $p=P(\alpha\hat{N}<0.9N|N)=Q((\alpha-0.9)/(\alpha\mu))$, which is independent of N and where Q(.) is the complementary CDF of the standard normal. Assuming an estimation period of 3 minutes and taking the average fraction of time that a room is not empty to be 0.67 (16 hours/day), the number of estimates per year (when occupied) is given by $M=365\times24\times16/24\times60/3=116800$. Then, the requirement that the probability of no more than 4 failures/year is $$\sum_{k=0}^{4}\binom{M}{k}p^k(1-p)^{M-k}\geq 0.95 \Rightarrow p\leq 1.68\times 10^{-5} \Rightarrow \mu =$$

$$\frac{\alpha-0.9}{\alpha Q^{-1}(p)}\leq \frac{\alpha-0.9}{\alpha 4.15}\Rightarrow MAE\leq \frac{\alpha-0.9}{\alpha 5.20}.$$

With an average transient-phase duration of 10 minutes per hour, the number of transient-period occupancy estimates per year (when the room is occupied) is given by $365\times24\times16/24\times10/3=19467$. Assuming (pessimistically) even zero savings during transient phases, the average energy savings per year (when occupied) expressed as a fraction is given by $$0\times\frac{19467}{M}+(1-\alpha\gamma)\times\frac{6.36}{5.72+6.36}\times\frac{M-19467}{M}=(1-\alpha\gamma)\times 0.44,$$

which assumes the following affine model for normalized (per person) airflow: $5.72+\gamma 6.36$ at occupancy level $\gamma$, and that cost is proportional to airflow. If this is to be larger than 0.3 (30% savings), then $$\alpha\leq \frac{0.32}{\gamma}.$$

Thus, even at an expected occupancy of $\gamma=0.3$, which may be above actual occupancy levels for a given building of interest, one can choose $\alpha=1.05$ and ensure an annual average energy savings of at least 30% while still meeting a specified failure rate. To understand how reliable the estimate produced by the system needs to be in order to satisfy the failure rate condition, the maximum per-person MAE that is required at different overestimation factors $\alpha$ can be computed. Overestimation factors may be adapted with time to capture medium-to-long-term occupancy patterns (weekends, holidays, etc.) to further optimize performance. This aspect may be part of self-commissioning and re-calibration capabilities of the system. Values may be fine-tuned over time with a better understanding of real-world constraints, e.g., a more detailed model of airflow and the error distribution of occupancy estimates.

Energy Savings Analysis

To determine the HVAC energy savings that can be achieved with the occupancy sensing system, a data-driven energy savings model based on building HVAC equipment specifications, current air supply levels, and actual building-use data obtained in the validation study. Table 3 below shows example airflow estimates that might be obtained using a Ventilation Airflow Model (VAM). While this model is representative of education and research environments in particular, many aspects of commercial office buildings are also represented in this example including offices, conference rooms, and large meeting spaces. This model includes air required as a function of both area (resulting in fixed airflow) and variable occupancy (as per ASHRAE 62.1-2013), so that the average yearly occupancy does not directly determine HVAC energy and cost reduction. This analysis indicates that airflow and HVAC energy use can be reduced by 39% if accurate occupancy data were available.

In some cases depending on the exact nature and use of the building, there may be potential for even greater reduction.

TABLE 3

| Room type | Area [ft² × 10⁻³] | Max No. of people | Average room size [ft²] | Max. occupied airflow [cfm] | Average yearly occupancy | Average occupied airflow [cfm] |
|---|---|---|---|---|---|---|
| Classrooms | 9.0 | 610 | 1,450 | 4,890 | 23% | 1,480 |
| Teaching Labs | 8.5 | 290 | 770 | 5,710 | 21% | 2,870 |
| Research Labs | 22.3 | 180 | 500 | 12,970 | 18% | 9,290 |
| Labs w/ Fume Hood | 6.9 | — | 530 | 6,860 | — | 6,860 |
| Colloquium room | 2.6 | 200 | 2,600 | 1,160 | 19% | 317 |
| Conference & Lounge | 8.5 | 430 | 380 | 2,640 | 22% | 438 |
| Offices | 24.2 | 245 | 190 | 2,670 | 21% | 1,430 |
| Bathrooms, Hallways, Storage | 47.5 | — | — | 3,470 | — | 3,470 |
| Building Total | 129 | 1,960 | | 40,400 | | 24,600 |

Potential energy cost savings by using OSSY can be assessed based on the cost of the air supplied and the amount of air that can be saved.

Other Applications

The occupancy system OSSY can also be used for other building applications include modulation of lighting in different spaces, determination of space utilization, and safety (e.g., response to fires and security threats).

In terms of lighting, the data determined by OSSY can be used to adjust and/or turn off lighting in different spaces where OSSY sensing systems are installed. For example, in a large exhibit or meeting rooms, areas unoccupied can have the lights turned off or down. Similarly, in areas occupied, the lighting levels can be increased. In such applications, OSSY may send not only occupant counts, but information as to location of occupants to a lighting control system that would use the spatial information to adjust lighting levels. Different lighting strategies, e.g., levels/intensities, can be pre-programmed.

For security related applications, OSSY occupancy data can be used to determine what areas of the building are occupied, as well as occupant density and numbers, and this information can be provided to internal building systems and emergency responders. For example, this data can be used to enable/prevent access to different parts of the building through closing different door systems electromechanically. The data can also be used to trigger different lighting systems or audio systems to advise building occupants as to the appropriate action in different spaces of the buildings, or to indicate to safety/security staff the locations of occupants in the building. For these applications, aggregated OSSY data can be sent to a security computer system and that data either presented to security staff in aggregated manner, and/or have actions taken in terms of access control, lighting signals, or information systems being implemented in an automatic fashion.

In terms of space utilization applications, OSSY may send data for different spaces to a central computer or web based system that aggregates the data and provides different utilization metrics such as capacity utilization that could be temporally disaggregated. In one application, this can provide information to a real-time scheduling system that can indicate to building managers and occupants which spaces are currently being utilized, or are expected to be utilized in a specified time range. In another application, this system can indicate to building managers how well their space is currently configured and used in terms of capacity utilization and temporally. Furthermore, information as to the building cost (rental, operational, etc.) for different areas can be combined to provide a more explicit evaluation of cost performance.

In more modern buildings, where a building automation system (BAS) is employed, these functions are many times combined into one software/computer based system that combines control of HVAC systems, lighting systems, and security related systems. The OSSY system can easily be incorporated into the BAS and the performance of the building can be extended to include utilization of OSSY based space occupancy/density data for enhanced HVAC control, lighting control, security and fire response, and space utilization analysis in one combined system.

While various embodiments of the invention have been particularly shown and described, it will be understood by those skilled in the art that various changes in form and details may be made therein without departing from the scope of the invention as defined by the appended claims.

What is claimed is:

1. Sensing and control apparatus for use in an HVAC system of a building, comprising:
a plurality of sensors including interior sensors and boundary sensors, the sensors generating respective sensor signals conveying occupancy-related features for an area of the building, the interior sensors being located and operative for wide-area monitoring within the area, the boundary sensors being located and operative for monitoring at ingress/egress points of the area; and
a controller configured and operative in response to the sensor signals to produce an occupancy estimate for the area and to generate equipment-control signals to cause the HVAC system to supply conditioned air to the area based on the occupancy estimate, the controller including a set of fusion systems collectively generating the occupancy estimate by corresponding fusion calculations, the fusion systems including a first fusion system producing a boundary occupancy-count change based on sensor signals from the boundary sensors, a second fusion system producing an interior occupancy count based on sensor signals from the interior sensors, and a third fusion system producing the occupancy estimate based on the boundary occupancy-count change from the first fusion system and the interior occupancy count from the second fusion system, wherein the fusion calculations include calculations based on assessing whether occupancy of the area is in a transient phase or in a steady-state phase at a time of producing the occupancy estimate, the fusion calculations in the transient phase adjusting relative importance of the boundary sensors and interior sensors and allowing for estimation scaling in producing the occupancy estimate, wherein:
the first fusion system performs a first temporally recursive update, within a first moving time window, of total boundary occupancy-count change by applying first fusion calculations to occupancy-count change detections produced by one or more first algorithms applied to (1) the sensor signals from the boundary sensors and (2) previous estimates of total boundary occupancy-count change;

the second fusion system performs a second temporally recursive update, within a second moving time window, of total interior occupancy count by applying second fusion calculations to occupancy count estimates produced by one or more second algorithms applied to (1) the sensor signals from the interior sensors and (2) previous estimates of total interior occupancy count; and the third fusion system performs a third temporally recursive update, within a third moving time window, of the number of occupants within the area by applying third fusion calculations to (1) respective outputs of the first and second fusion systems and (2) previous estimates of number of occupants within the area.

2. The sensing and control apparatus of claim 1, wherein the first fusion system produces the boundary occupancy-count change by performing a calculation across all sensor modalities, sensor instances, and estimating algorithms for a boundary of the area.

3. The sensing and control apparatus of claim 2, wherein the sensor modalities include low-resolution imaging sensor arrays.

4. The sensing and control apparatus of claim 1, wherein the second fusion system produces the interior occupancy count by performing a fusion calculation across all sensor modalities, sensor instances, and estimating algorithms for an interior of the area.

5. The sensing and control apparatus of claim 4, wherein the sensing modalities include video cameras.

6. The sensing and control apparatus of claim 5, wherein at least some of the video cameras have overlapping fields of view and the fusion calculation includes, for each overlapping field of view for a corresponding set of cameras, fusion of estimates for the cameras of the set.

7. The sensing and control apparatus of claim 5, wherein the fusion calculation includes, for each of one or more of the cameras, use of multiple distinct estimating algorithms and fusion of estimates from the distinct estimating algorithms to produce an estimate for the respective camera.

8. The sensing and control apparatus of claim 1, wherein the sensors are of two or more distinct modalities, and one or more of the fusion systems performs cross-modality fusion of respective estimates produced for sensors of distinct modalities.

9. The sensing and control apparatus of claim 8, wherein the distinct modalities include an image modality and a binary presence/absence modality, and the cross-modality fusion includes a fusion calculation incorporating a first estimate obtained for one or more image-modality sensors and a second estimate obtained for one or more presence/absence-modality sensors.

10. The sensing and control apparatus of claim 9, wherein the presence/absence-modality sensors are boundary sensors and the second estimate includes time-integration of counts from the presence/absence-modality sensors to corresponding occupancy estimates.

11. The sensing and control apparatus of claim 10, wherein the presence-absence-modality sensors are low-resolution thermal sensors.

12. The sensing and control apparatus of claim 1, wherein the sensors include a plurality of same-type sensors, and one or more of the fusion systems performs cross-instance fusion of respective estimates produced for different ones of the same-type sensors.

13. The sensing and control apparatus of claim 12, wherein the same-type sensors are imaging sensors.

14. The sensing and control apparatus of claim 12, wherein the cross-instance fusion includes a fusion of distinct estimates for respective same-type sensors having an overlapping field of view.

15. The sensing and control apparatus of claim 1, wherein one or more of the fusion systems generates a plurality of estimates for a given sensor using corresponding distinct estimating algorithms, and performs a fusion calculation combining the respective estimates from the distinct estimating algorithms to arrive at an estimate for the given sensor.

16. The sensing and control apparatus of claim 1, wherein the assessment is based on the boundary occupancy-count change exceeding a predetermined threshold.

17. The sensing and control apparatus of claim 1, wherein the estimation scaling includes applying an estimation scaling factor to a raw occupancy estimate produced by the fusion systems, the estimation scaling factor being either (i) greater than one to bias the occupancy estimate toward overestimation to reduce a risk of under-ventilation while still achieving a predetermined minimum energy savings attributable to use of the occupancy-based control, or (ii) less than one to bias the occupancy estimate toward underestimation to provide additional energy savings while retaining an acceptable risk of under-ventilation.

18. The sensing and control apparatus of claim 17, wherein the controller automatically adapts the estimation scaling factor over time to capture medium-to-long-term occupancy patterns and thereby further optimize performance.

* * * * *